(12) United States Patent
Weindorf

(10) Patent No.: US 6,255,784 B1
(45) Date of Patent: Jul. 3, 2001

(54) PHOTOPIC BRIGHTNESS CONTROLLER FOR FLUORESCENT BACKLIGHTS

(75) Inventor: Paul Frederick Luther Weindorf, Novi, MI (US)

(73) Assignee: Visteon Global Technologies, Inc.

( * ) Notice: Subject to any disclaimer, the term of this patent is extended or adjusted under 35 U.S.C. 154(b) by 0 days.

(21) Appl. No.: 09/452,978

(22) Filed: Dec. 2, 1999

(51) Int. Cl.$^7$ ........................................................ G05F 1/00
(52) U.S. Cl. ...................... 315/291; 315/224; 315/149; 315/155; 315/DIG. 4; 250/205
(58) Field of Search ............................ 315/291, 307, 315/224, 294, 149, 151, 155, 157–159, DIG. 4; 250/214.1, 214 AL, 205

(56) References Cited

U.S. PATENT DOCUMENTS

| | | | |
|---|---|---|---|
| 4,368,406 | 1/1983 | Kruzich et al. | 315/158 |
| 5,051,924 | * 9/1991 | Berman et al. | 315/324 |
| 5,057,744 | 10/1991 | Barbier et al. | 315/10 |
| 5,170,035 | 12/1992 | Webster et al. | 250/214 R |
| 5,194,782 | 3/1993 | Richardson et al. | 315/291 |
| 5,210,467 | 5/1993 | Nagashima | 315/158 |
| 5,340,974 | 8/1994 | Zalewski | 250/205 |
| 5,504,661 | 4/1996 | Szpak | 362/30 |

\* cited by examiner

*Primary Examiner*—Haissa Philogene
(74) *Attorney, Agent, or Firm*—Quarles & Brady LLP

(57) ABSTRACT

A photopic light sensor for controlling the apparent brightness to a human observer of a fluorescent backlight uses a broad spectrum photodiode and a daylight-filtered photodiode, the latter sensing predominantly the infrared region of the broad spectrum. By properly scaling and subtracting signals from these two photodiodes, an effective response of a photopic sensor is created which may be used in a feedback loop to control the brightness of a fluorescent tube in automotive applications without the expense or package constraints incident to an infrared blocking filter of a true photopic sensor.

22 Claims, 3 Drawing Sheets

FIG. 2
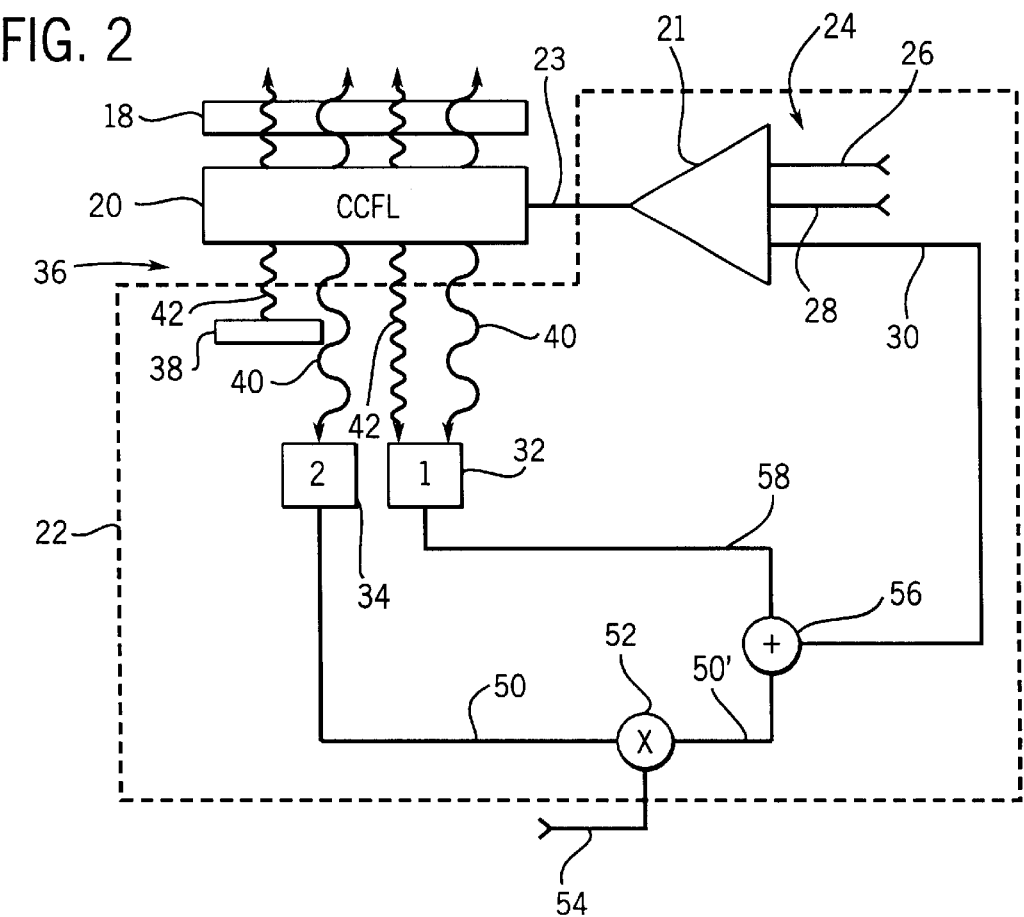
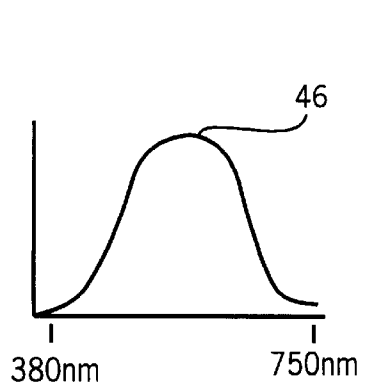
FIG. 3
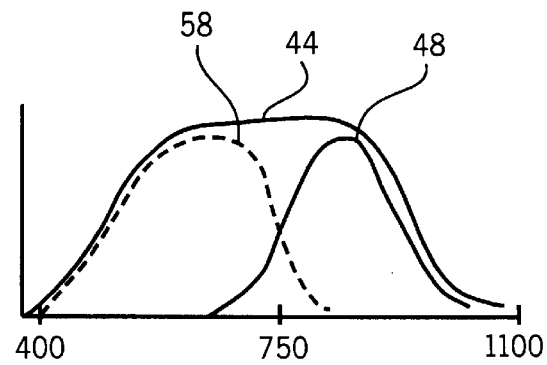
FIG. 4

PHOTOPIC BRIGHTNESS CONTROLLER FOR FLUORESCENT BACKLIGHTS

BACKGROUND OF THE INVENTION

This invention relates generally to controllers for lamps used to illuminate liquid crystal displays ("backlights") and the like and, in particular, to a backlight controller that accurately controls the apparent brightness of the backlight to the human eye.

Liquid Crystal Displays (LCD) provide a rugged and flexible display suitable for use in automotive applications. The LCD is backlit typically by a cold cathode fluorescent lamp (CCFL). Such fluorescent lamps are bright and relatively efficient and can be fabricated to provide even illumination over a large area.

Unfortunately, CCFL's are sensitive to temperature and vary in brightness as the passenger compartment and console warms up. One method of correcting for this variation is to make a temperature measurement at the CCFL and to vary its driving power to maintain constant illumination. The relationship between driving power, illumination and temperature is a complex function which may be implemented in lookup tables or algorithms incorporated into a microcontroller providing an output to the lamp. This approach is not entirely successful at low brightness levels and elevated temperatures where small changes in power, typically less than the quantization errors of the algorithms or tables, can result in greatly varying brightness.

A second approach to controlling the brightness of such lamps is to monitor their light output using an electronic light sensor and to use the measured output to control the power to the lamp by means of a feedback loop. A silicon photodiode may be used to measure the light from the lamp. Silicon photodiodes are inexpensive, rugged and available in a wide range of different package types including those suitable for surface mounting on a printed wiring board. Surface mount packages are smaller than packages that require sockets or holes in the printing wiring board to receive leads. Surface mounting lowers the cost of the photodiode.

Silicon photodiodes have sensitivity to a range of light frequencies that extend significantly into the infrared region invisible to the human observer. Unfortunately at cold temperatures, the CCFL's output a large amount of infrared radiation. For this reason, if an ordinary silicon photodiode is used to control a CCFL, the perceived brightness of the CCFL to a human observer will vary, being dimmer at cold temperatures, for example, when the output of infrared radiation is greater.

This problem may be solved by the use of an infrared filter, such as a special glass that absorbs the infrared portion of the light before it strikes the photodiode. Photodiodes with such filters, however, are relatively expensive and are not available in packages desired for use in the automotive field.

SUMMARY OF THE INVENTION

The present invention provides a photodetector that approximates the response of the human eye (the photopic curve) and which therefore may be used to control the perceived brightness to a human observer of a CCFL or other similar backlight. Instead of using a relatively expensive "infrared-filtered" silicon photodiode, the present inventor has recognized that common "daylight-filtered" silicon photodiodes (filtering out all but the infrared region) may be used in conjunction with an unfiltered silicon photodiode to produce the same result. The signal from the daylight-filtered photodiode is subtracted from the unfiltered photodiode to approximate the photopic curve.

In contrast to infrared-filtered photodiodes, daylight-filtered silicon photodiodes are widely available at low cost and a wide variety of packages for use in consumer electronics such as infrared remote controls where the daylight filtering prevents ambient light from interfering with the infrared control signals. For this reason, combining the two devices of a daylight-filtered and unfiltered silicon photodiode may produce a photopic detector of lower cost and smaller package size than a single infrared-filtered silicon photodiode.

Specifically then, the present invention provides an illumination control for a fluorescent backlight having a first light sensor producing a first electronic signal dependent on sensed light in a first and second frequency range of sensitivity where the first frequency range of sensitivity corresponds substantially to light frequencies that the human eye sees and the second range of sensitivity corresponds substantially to light frequencies that the human eye does not see. A second light sensor is also used producing a second electronic signal dependent on sensed light in a third frequency range of sensitivity substantially overlapping the second frequency range but not the first frequency range. The fluorescent backlight illuminates the first and second light sensors by an amount dependent on a drive signal from a fluorescent driver circuit, which varies the drive signal to the fluorescent bulb according to a feedback control signal input. A subtractor subtracts the second electronic signal from the first electronic signal to produce the feedback control signal.

Thus it is one object of the invention to provide a light sensor that effectively conforms to the photopic curve without the need for expensive filters or a limited selection of device packages. By independently sensing light that is invisible and visible to the human eye and subtracting one from the other, a feedback control signal related to the desired response curve may be obtained.

The first and second light sensors may be silicon photodiodes and the second light sensor may include a filter blocking light in the first range.

Thus it is another object of the invention to make use of commonly available silicon photodiodes having similar or identical electrical characteristics. A filter on one photodiode provides the necessary frequency discrimination. It is another object of the invention to make use of commercially available daylight-filtered photodiodes widely used in consumer electronics.

The fluorescent driver circuit may also receive a desired brightness signal and may also control the drive signal of the fluorescent bulb according to the desired brightness signal.

Thus it is another object of the invention to provide a control that may accept an independent brightness signal allowing the user to change the brightness of the fluorescent tube.

The fluorescent bulb may be mounted against a first face of a printed wiring board and the first and second detectors may be mounted on the first face of the printed wiring board between the fluorescent bulb and the printed wiring board to receive light directly from the back of the fluorescent bulb. Alternatively, the printed wiring board may include at least one aperture and the first and second detectors may be mounted on a second obverse face of the printed wiring board over the aperture to receive light from the fluorescent bulb through the aperture.

Thus it is another object of the invention to provide a rugged and low cost assembly for supporting and controlling the fluorescent bulb.

A scaling circuit may be used to scale at least one of the first and second electronic signals prior to receipt by the subtractor.

Thus it is another object of the invention to provide for corrections of errors caused by filter absorption, small differences between the electrical characteristics of the first and second light sensors, and other dependencies such as temperature dependency, through the use of a scaling circuit that may be adjusted for the particular devices.

The foregoing and other objects and advantages of the invention will appear from the following description. In the description, reference is made to the accompanying drawings, which form a part hereof, and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE DRAWINGS

FIG. 2 is a simplified block diagram of the control circuitry and fluorescent lamp of FIG. 1;

FIG. 3 is a simplified representation of the photopic curve plotting perceived brightness against light frequency and indicating sensitivity of the human to different frequencies of light;

FIG. 4 is a figure similar to that of FIG. 3 showing the sensitivity of a commercial silicon photodiode with and without daylight-filtering and showing an effective sensitivity produced by subtracting daylight-filtered and unfiltered photodiode signals from each other per the present invention to realize a curve similar to that of FIG. 3;

DETAILED DESCRIPTION OF THE INVENTION

Figure 1:
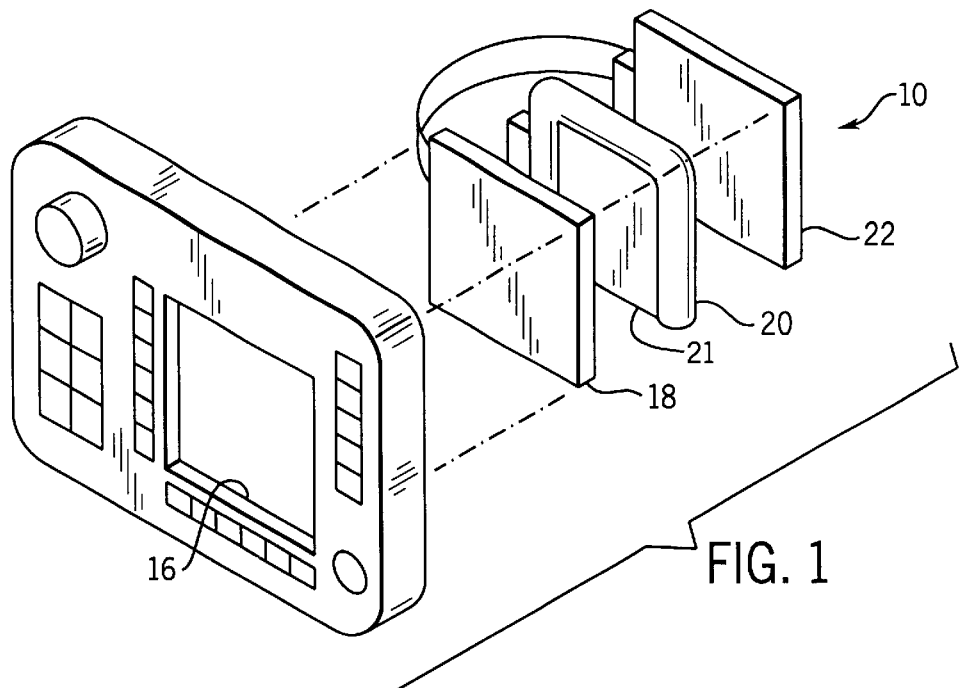
FIG. 1 is a perspective, exploded view of an automotive control console showing an LCD positioned behind a bezel of the control console and in front of a fluorescent lamp, the latter of which is supported by a printed wiring board holding control circuitry of the present invention.

Referring now to FIG. 1, an automotive console 10 includes a bezel 12 supporting user controls 14 and a display opening 16. Positioned behind the display opening 16 is a Liquid Crystal Display ("LCD") 18 followed by a fluorescent backlight 20. The fluorescent backlight 20 surrounds a light pipe 21 to provide a large area, even illumination commensurate with the area of the LCD 18. The backlight 20 provides light passing through the LCD 18 so as to make figures displayed on the LCD 18 visible through the opening 16 to a driver or passenger for all lighting conditions ranging from fill sunlight to conditions of low ambient light.

A circuit card 22 may be positioned behind the backlight 20 to support control electronics of the present invention as well as the necessary control electronics for the LCD 18.

Referring now also to FIG. 2, the backlight 20 may connected to a driver 21 typically including an inverter converting a source of direct current from the automotive battery (not shown) to an alternating current ("AC") drive waveform whose power may be controlled by one or more inputs 24 to the driver 21. Typically the inputs 24 include a brightness input 26 providing means for a user or automatic control to vary the brightness of the backlight 20 and optionally other control inputs 28 such as may adjust the fluorescent backlight RMS current level 23 according to other conditions such as ambient illumination and/or bulb temperature. A feedback control signal 30 is also received by the driver 21 per the present invention as will be described below. Driver 21 may use Pulse Width Modulation (PWM) techniques to control the brightness of the fluorescent backlight 20.

Referring now to FIGS. 2, 3 and 4, a first and second silicon photodiode 32 and 34 are positioned on the circuit card 22 so as to receive light 36 from the fluorescent backlight 20. The photodiodes 32 and 34 are preferably silicon photodiodes operated in a photo-amperic mode as will be described below. The photodiodes 32 and 34 are preferably electrically similar, however, photodiode 34 is daylight-filtered by the incorporation of a filter layer 38 between the photodiode 34 and the fluorescent backlight 20 such as admits substantially only infrared light 40 but blocks visible light 42. Such daylight-filtered photodiodes 34 are used as receptors for infrared communications in a wide variety of consumer electronics. In these applications, daylight sensitivity is not desired because daylight or other household illumination tends to saturate the photodiode blinding it to the weaker infrared signal that it was intended to receive.

As shown in FIG. 4, the response for the silicon photodiode 32 without the filter is a broad spectrum indicated by curve 44 extending substantially from 400 nanometers to 1,100 nanometers in frequency range of sensitivity. In contrast as shown in FIG. 3, the photopic curve 46 indicating the sensitivity of the human eye extends approximately from 380 nanometers to 750 nanometers, the range beyond 750 nanometers being generally the infrared region.

The filter layer 38 when used with the photodiode 34 creates a response that is largely sensitive to the infrared region only as indicated by curve 48 extending from approximately 750 nanometers to 1,100 nanometers.

Referring now to FIGS. 2 and 4, a signal 50 from the photodiode 34 is received by a scaling circuit 52, whose purpose will be described, which provides multiplication of that signal by a fixed scaling factor 54. The scaled signal 50' is then received by a summing circuit 56 and subtracted from a signal 58 from the photodiode 32. As shown in FIG. 4, this subtraction yields the feedback control signal 30 approximating the photopic curve 46. This feedback control signal 30 is provided to the driver 21 and serves to increase the drive signal 23 with decreases in the feedback control signal 30.

To the extent that the sensitivity of the photodiodes 34 and 32 are identical and the sensitivity of the photodiode 34 precisely indicates the amount of invisible infrared light 40 received from the backlight 20, the range of the photopic curve is well approximated. Because the shape of the curves 44 and 48 outside of the spectrum emitted by the backlight 20 is immaterial, neither curve must be precisely related to the other provided they overlap in the appropriate infrared region.

The signal from photodiode 34 may be somewhat less than photodiodes 32 as a result of the absorption of the filter layer 38 in the visible spectrum or as a result of different degrees of temperature sensitivity caused by different manufacturers and variations in the manufacturing process. The scaling of the scaling circuit 52 by the scaling factor 54 is used to null-out such differences.

Figure 5:
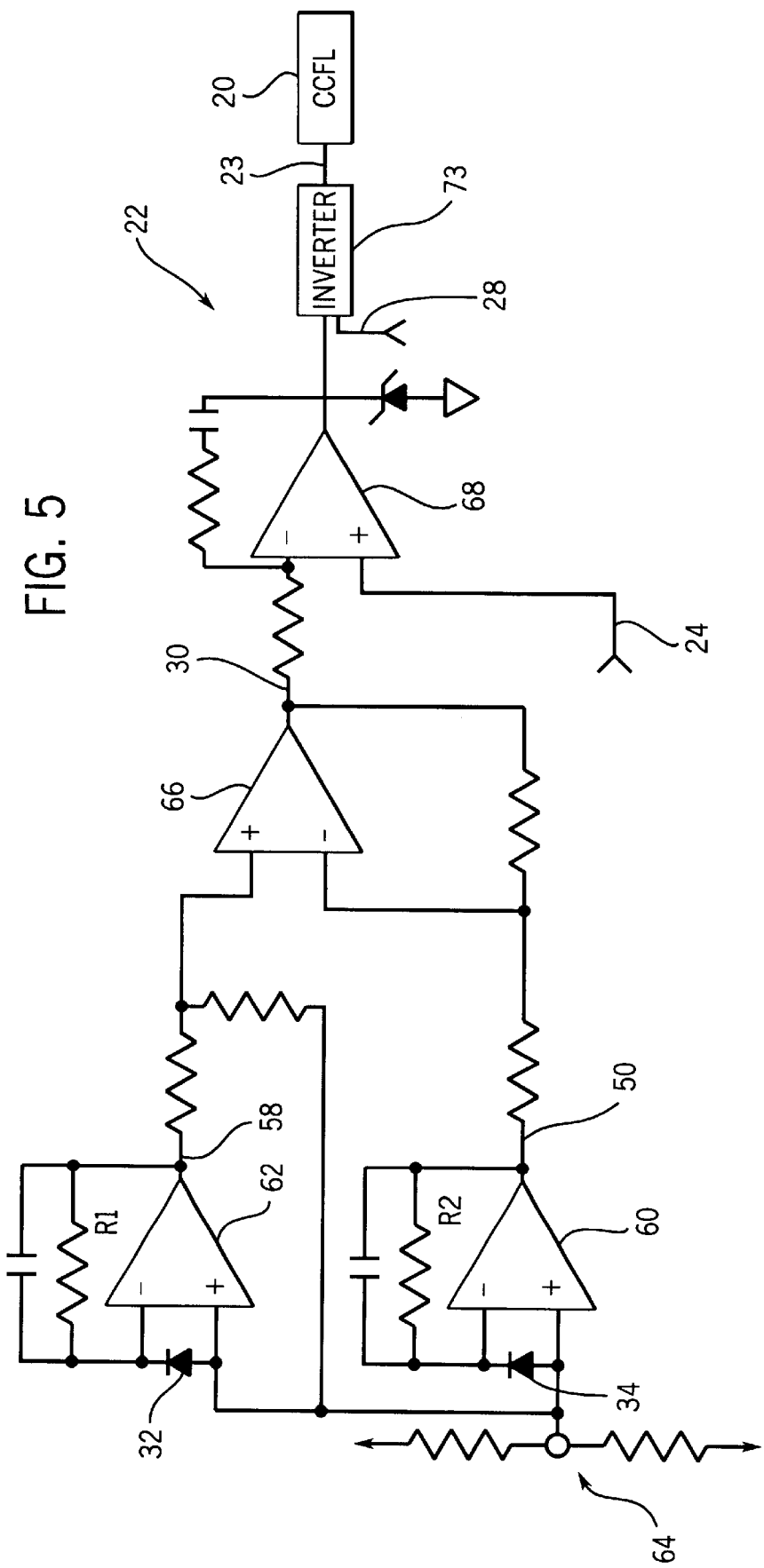
FIG. 5 is a detailed schematic of a circuit to implement the blocks of FIG. 2.

Referring now to FIG. 5, circuitry for implementation of the blocks of FIG. 2 may include a first and second operational amplifier 60 and 62, the former associated with photodiode 34 and the latter associated with photodiode 32. The photodiodes 34 and 32 in each case are connected directly across the inverting and non-inverting inputs of the respective operational amplifier 60 and 62 with their cathodes facing the inverting input.

Feedback resistors $R_1$ for operational amplifier 62, and $R_2$ for operational amplifier 60 extending from the output of the respective operational amplifiers to its inverting input in normal inverting mode and provide by their ratio, a relative scaling between signals 50 and 58 produced by those operational amplifiers represented by scaling circuit 52 of FIG. 2 described above.

The non-inverting inputs of the operational amplifiers 60 and 62 may be connected to a divider circuit 64 providing the necessary offset for operation of the operational amplifier with a single-sided automotive supply.

Outputs 58 and 50 from operational amplifier 62 and 60 are received by operational amplifier 66 operating as a summing (subtraction) circuit 56 described in FIG. 2 according to methods well known in the art to produce the feedback control signal 30.

Succeeding operational amplifier 68 provides integration of the feedback control signal 30 of the summing operational amplifier 66 (which is received at the inverting input of operational amplifier 68). Operational amplifier 68 further receives, at its non-inverting input, input signals 24 such as may provide the commanded brightness of the backlight 20 independent of the feedback control signal 30. Thus, the amplifier 68 controls the inverter drive level such that the feedback light level signal is equal to the commanded or desired light level signal 24. By operating amplifier 68 in a high gain integrator configuration, the DC loop gain is extremely high thus yielding negligible error between the feedback brightness 30 and the commanded brightness 24. The output of the operational amplifier 68 connects to an inverter 73, which together with operational amplifier 68, forms the driver 21 of FIG. 2. The power supplied by the inverter 73 to the backlight 20 is a function of the output of the operational amplifier 68 either through a modification of voltage, current or duty cycle of drive signal 23.

Figure 6:
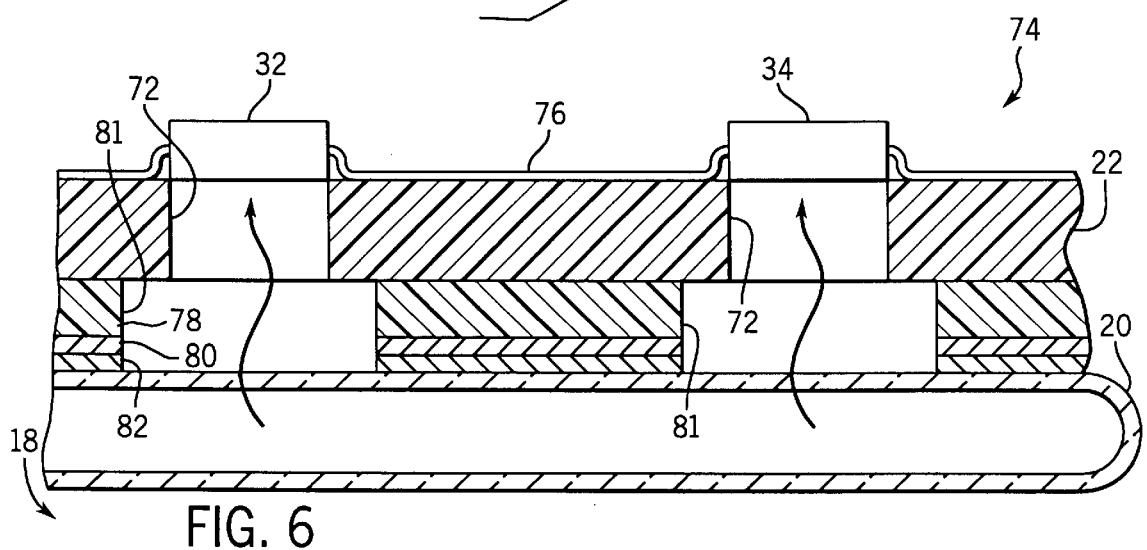
FIG. 6 is a cross-section through the assembly of FIG. 1 taken along lines 6—6 showing a first method of mounting the photodetectors to a printed circuit board adjacent to the fluorescent display.

Referring now to FIGS. 2 and 6, the backlight 20 emits light both from its front surface toward the LCD 18, and through its rear surface toward a front face of the circuit card 22. Apertures 72 may be cut through the circuit card 22 and a rear face 74 of the circuit card, obverse to the front face adjacent to the fluorescent backlight 20, may support the photodiodes 32 and 34 in surface mount packages attached to wiring 76 on the rear face 74 of the circuit card 22. An insulating spacer 78 may be placed on the front side of the circuit card 22 between the backlight 20 and the circuit card 22 to provide insulation and support for circuit card 22 and may on its face, toward the fluorescent backlight 20, include a metallic shield 80 and reflective light surface 82. The metallic layer 80 needed to "strike" the lamp also provides electrical shielding from the noise generated by the fluorescent backlight 20 and the reflective layer 82 and the strike ground return 80 and increases the efficiency of the tube by reflecting rearward exiting light toward the LCD 18. Each of insulating spacer 78, metallic shield 80 and reflective light surface 82 have apertures 81 aligned with and corresponding to apertures 72.

Figure 7:
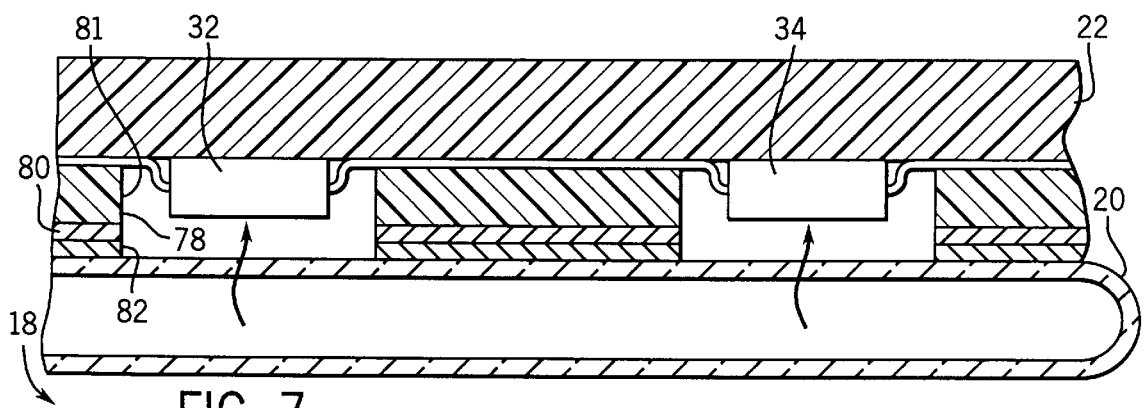
FIG. 7 is a figure similar to that of FIG. 6 showing a second method of mounting the photodetectors to the printed wiring board.

In an alternative embodiment shown in FIG. 7, the aperture 72 may be dispensed with and the photodiodes 32 and 34 may be mounted on the front face of the circuit card 22 toward the fluorescent backlight 20 in the apertures 81 in the insulating spacer 78, metal layer 80 and reflective light surface 82.

In either case as so assembled, the fluorescent backlight 20 and circuit card 22 provide a rugged integrated assembly.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

| | |
|---|---|
| 10 | automotive console |
| 11 | scaling circuits |
| 12 | bezel |
| 14 | buttons |
| 16 | window |
| 18 | LCD |
| 19 | frequency range |
| 20 | backlight |
| 21 | driver |
| 22 | circuit card |
| 23 | drive signal |
| 24 | inputs |
| 26 | brightness input |
| 28 | other control input |
| 30 | control signal (see also #28) |
| 32 | photodiode |
| 34 | photodiode |
| 36 | light |
| 38 | filter layer |
| 40 | infrared light |
| 42 | visible light |
| 44 | broad spectrum curve |
| 46 | photopic curve |
| 48 | line |
| 50 | signal |
| 52 | scaling circuit |
| 54 | scaling factor |
| 56 | summing circuit |
| 58 | signal (see also #50) |
| 60 | operational amplifier |
| 62 | operational amplifier (see also #60) |
| 64 | divider circuit |
| 66 | operational amplifier (see also #62) |
| 68 | operational amplifier (see also #66) |
| 72 | aperture |
| 73 | inverter |
| 74 | rear face |
| 76 | wiring |
| 78 | insulating spacer |
| 80 | metallic shield |
| 81 | apertures (see also #74) |
| 82 | reflective light surface |

I claim:
1. An illumination control for a fluorescent backlight comprising:
   a first light sensor producing a first electronic signal dependent on sensed light in a first and second frequency range, the first frequency range corresponding substantially to light frequencies that the human eye sees and the second frequency range corresponding substantially to light frequencies that the human eye does not see;
   a second light sensor producing a second electronic signal dependent on sensed light in a third frequency range substantially overlapping the second frequency range but not the first frequency range;

a fluorescent bulb illuminating the first and second light sensors according to a received drive signal;

a fluorescent driver circuit varying the drive signal to the fluorescent bulb according to a feedback control signal input; and a subtractor subtracting the second electronic signal from the first electronic signal to produce the feedback control signal whereby the feedback control signal is dependent substantially on light only in the first frequency range.

2. The illumination control of claim 1 wherein the first and second light sensors are silicon photodiodes.

3. The illumination control of claim 1 wherein the second light sensor includes a filter blocking light in the first range.

4. The illumination control of claim 3 wherein the filter passes infrared light.

5. The illumination control of claim 1 wherein the fluorescent driver circuit also receives a desired brightness signal and also controls the drive signal of the fluorescent bulb according to the desired brightness signal.

6. The illumination control of claim 1 wherein the fluorescent driver circuit also receives an bulb temperature signal and also controls the drive signal level of the fluorescent bulb according to the bulb temperature signal.

7. The illumination control of claim 1 including further a printed wiring board; and wherein the fluorescent bulb is mounted against a first face of the printed wiring board and the first and second detectors are mounted on the first face of the printed wiring board between the fluorescent bulb and the printed wiring board to receive light directly from the fluorescent bulb.

8. The illumination control of claim 1 including further a printed wiring board having at least one aperture; and wherein the fluorescent bulb is mounted against a first face of the printed wiring board and the first and second detectors are mounted on a second obverse face of the printed wiring board over the aperture to receive light from the fluorescent bulb through the aperture.

9. The illumination control of claim 1 wherein the first frequency range is substantially 380 nm to 750 mn.

10. The illumination control of claim 1 wherein the second and third frequency ranges are substantially 750 mn to 1100 nm.

11. The illumination control of claim 1 including further a scaling circuit scaling at least one of the first and second electronic signal prior to receipt by the subtractor.

12. The illumination control of claim 1 wherein the fluorescent driver circuit integrates the feedback control signal.

13. A method of controlling a fluorescent backlight comprising the steps of:

(a) detecting light from a fluorescent bulb with a first light sensor producing a first electronic signal dependent on sensed light in a first and second frequency range of sensitivity, the first frequency range of sensitivity corresponding substantially to light frequencies that the human eye sees and the second range of sensitivity corresponding substantially to light frequencies that the human eye does not see;

(b) detecting light from the fluorescent bulb with a second light sensor producing a second electronic signal dependent on sensed light in a third frequency range of sensitivity substantially overlapping the second range of frequencies but not the first range of frequencies; and (c) subtracting the second electronic signal from the first electronic signal to produce a drive signal for the fluorescent bulb controlling the brightness of the fluorescent bulb based on light only in the first frequency range of sensitivity.

14. The method of claim 13 wherein the first and second light sensors are silicon photodiodes.

15. The method of claim 13 including the step of filtering light to the second light sensor to block light in the first range.

16. The method of claim 13 including the step of modifying the drive signal according to a desired brightness signal independent of the light received from the first and second detectors.

17. The method of claim 13 including the step of modifying the drive signal according to an bulb temperature signal.

18. The method of claim 13 including the steps of:

mounting a fluorescent bulb against a first face of a printed wiring board; and mounting the first and second detectors on the first face of the printed wiring board between the fluorescent bulb and the printed wiring board to receive light directly from the fluorescent bulb.

19. The method of claim 13 including the steps of:

cutting at least one aperture in a printed wiring board; and mounting a fluorescent bulb against a first face of the printed wiring board; and mounting the first and second detectors on a second obverse first face of the printed wiring board over the aperture to receive light through the aperture from the fluorescent bulb.

20. The method of claim 13 wherein the first frequency range is substantially 380 nm to 750 nm.

21. The method of claim 13 including further scaling at least one of the first and second electronic signals prior to subtracting them at step (c).

22. The method of claim 13 further including the step of integrating the difference between the first electronics signal and the second electronic signal to produce the drive signal.

* * * * *

UNITED STATES PATENT AND TRADEMARK OFFICE
CERTIFICATE OF CORRECTION

PATENT NO. : 6,255,784 B1
DATED : July 3, 2001
INVENTOR(S) : Weindorf

It is certified that error appears in the above-identified patent and that said Letters Patent is hereby corrected as shown below:

Column 3,
Line 64, "fill" should be -- full --.

Column 7, claim 9,
Line 44, "750 mn" should be -- 750 nm --.

Column 7, claim 10,
Line 46, "750 mn" should be -- 750 nm --.

Signed and Sealed this

Twenty-sixth Day of February, 2002

Attest:

Attesting Officer

JAMES E. ROGAN
*Director of the United States Patent and Trademark Office*